(12) United States Patent
Fischer et al.

(10) Patent No.: US 10,784,477 B2
(45) Date of Patent: Sep. 22, 2020

(54) RECHARGEABLE BATTERY WITH ELASTICALLY COMPLIANT HOUSING

(71) Applicant: Viking Power Systems Pte. Ltd., Singapore (SG)

(72) Inventors: Christopher Fischer, Concord, MA (US); Thomas Gillooly, Brighton, MA (US); David Eaglesham, Lexington, MA (US); Robert Ellis Doe, Medfield, MA (US)

(73) Assignee: Viking Power Systems Pte. Ltd., Singapore (SG)

( * ) Notice: Subject to any disclaimer, the term of this patent is extended or adjusted under 35 U.S.C. 154(b) by 44 days.

(21) Appl. No.: 15/822,119

(22) Filed: Nov. 25, 2017

(65) Prior Publication Data

US 2018/0151856 A1    May 31, 2018

Related U.S. Application Data

(60) Provisional application No. 62/426,869, filed on Nov. 28, 2016.

(51) Int. Cl.
*H01M 2/10*        (2006.01)
*H01M 10/0525*   (2010.01)
(Continued)

(52) U.S. Cl.
CPC ......... *H01M 2/1072* (2013.01); *B64C 39/024* (2013.01); *H01M 4/386* (2013.01);
(Continued)

(58) Field of Classification Search
CPC ............. H01M 2/1072; H01M 10/058; H01M 10/052; H01M 10/0481; H01M 10/0413;
(Continued)

(56) References Cited

U.S. PATENT DOCUMENTS

| 393,573 A | 11/1888 | Paget |
|---|---|---|
| 5,879,831 A | 3/1999 | Ovshinsky et al. |

(Continued)

FOREIGN PATENT DOCUMENTS

GB    821572 A    10/1959

OTHER PUBLICATIONS

C. Woodford, "Lithium-ion batteries," Explain That Stuff (webpage, retrieved Jan. 22, 2018) <https://web.archive.org/web/20161116161541/http://www.explainthatstuff.com/how-lithium-ion-batteries-work.html> (Jul. 21, 20116).

(Continued)

*Primary Examiner* — Muhammad S Siddiquee
(74) *Attorney, Agent, or Firm* — Downs Rachlin Martin PLLC (57) ABSTRACT

A rechargeable battery with elastically compliant housing includes a housing and at least one battery cell. The housing includes a pair of substantially rigid end plates and an elastically compliant structure joining the end plates so that the end plates are oriented in respective planes that are substantially parallel to each other and define a gap there between. Each battery cell is contained in the housing in the gap between the end plates and includes an anode, a cathode, and a separator between the anode and the cathode. The elastically compliant structure joins the end plates and includes an elastic component that exhibits elastic expansion greater than 3% along an axis orthogonal to the planes in which the end plates are oriented.

23 Claims, 7 Drawing Sheets

(51) Int. Cl.
  *H01M 10/058* (2010.01)
  *H01M 10/04* (2006.01)
  *H01M 10/052* (2010.01)
  *B64C 39/02* (2006.01)
  *H01M 4/38* (2006.01)

(52) U.S. Cl.
  CPC ... *H01M 10/0413* (2013.01); *H01M 10/0481* (2013.01); *H01M 10/052* (2013.01); *H01M 10/058* (2013.01); *H01M 10/0525* (2013.01); *B64C 2201/042* (2013.01); *H01M 2220/20* (2013.01); *Y02E 60/122* (2013.01)

(58) Field of Classification Search
  CPC ............. H01M 4/386; H01M 10/0525; H01M 2220/20; B64C 39/024; B64C 2201/042; Y02E 60/122
  See application file for complete search history.

(56) References Cited

U.S. PATENT DOCUMENTS

| | | | |
|---|---|---|---|
| 6,087,036 A * | 7/2000 | Rouillard | H01M 2/202 429/120 |
| 6,669,826 B1 | 12/2003 | Migate, Jr. et al. | |
| 7,704,637 B2 | 4/2010 | Yan et al. | |
| 8,124,270 B2 | 2/2012 | Asahina et al. | |
| 8,298,700 B2 | 10/2012 | Asahina et al. | |
| 9,343,772 B2 | 5/2016 | Byun | |
| 2006/0191095 A1* | 8/2006 | Buchanan, Jr. | B60S 1/3475 15/250.352 |
| 2008/0124625 A1 | 5/2008 | Hock et al. | |
| 2011/0177377 A1* | 7/2011 | Dube | H01M 2/0207 429/153 |
| 2011/0217617 A1* | 9/2011 | Andreas-Schott | H01M 8/248 429/465 |
| 2015/0188122 A1* | 7/2015 | Green | H01M 4/0492 429/218.1 |
| 2015/0214570 A1* | 7/2015 | Deponte | H01M 10/0481 429/99 |
| 2016/0172660 A1* | 6/2016 | Fischer | H01M 4/0452 429/188 |

OTHER PUBLICATIONS

USPTO, International Search Report and Written Opinion for PCT/US17/63236 (related PCT application) (dated Feb. 2, 2018).

* cited by examiner

RECHARGEABLE BATTERY WITH ELASTICALLY COMPLIANT HOUSING

RELATED APPLICATION

This application claims the benefit of U.S. Provisional Application No. 62/426,869, filed 28 Nov. 2016, the entire content of which is incorporated herein by reference.

BACKGROUND

Rechargeable or secondary cells and batteries comprising a plurality of cells, have wide-ranging applications that require persistent improvement of battery performance. A common problem in the design of battery packs lies in the mechanical design of the pack itself, wherein the battery needs to accommodate the dimensional changes of the battery over the course of its lifetime. These dimensional changes may be in the form of the gradual increase in the dimensions of the battery as it ages (i.e., "swelling") or by the cyclic changes in the dimensions of the battery over the course of each cycle (i.e., "breathing"). In Pb-acid batteries, for example, the primary dimensional change is typically swelling caused by the gradual accumulation of Pb sulfates as a side-reaction in the cell.

Li-ion cells generally contain active materials that operate on the principle of intercalation wherein $Li^+$ ions migrate in and out of host structures (e.g., graphitic negative electrodes and layered transition metal oxide positive electrode materials) in a reversible fashion without inducing large structural changes to the host material. In the case of Li-ion cells where intercalation reactions occur on both electrodes, there is relatively little dimensional change (typically <0.5% volume swing) during cycling (i.e., breathing), as the partial molar volume of Li is near zero at both electrodes. Furthermore, irreversible expansion (i.e., swelling) is typically limited by the slow growth of the solid electrolyte interphase (SEI) layer. Fundamentally, these limited dimensional changes during cycling provide a high degree of reversibility for the electrochemical reactions in the cell; however, the limited dimensional changes also limit the energy density of the electrode stack and, therefore, the cell.

It is widely accepted that significant improvement in energy density could be obtained by migration away from pure intercalation host reactions to electrode reactions involving fundamentally different physical processes during operation as the latter reactions allow for denser storage of Li ions compared to intercalation. Among these reactions are conversion reactions, displacement reactions, alloying reactions, and metal deposition. However, these reaction types are typically associated with relatively large structural change (e.g., ≥5% volume expansion) within the electrode materials and, therefore, of the battery cell. That is, the cell is sometimes said to "breathe", as a characterization of the physical expansion and contraction during charge and discharge. Fundamentally, a high degree of repeated volume expansion and contraction due to the electrochemical reaction in the cell will coincide with a higher proportion of mechanical degradation of the cell assembly (e.g., electrode stack, cell and battery package fatigue) resulting in deterioration of the cell, cycle life, power density, and margin for safe operation, thus offsetting gains in energy density.

In the case of conventional intercalation batteries, with their much smaller expansion and contraction, there have been a variety of attempts to mitigate the deleterious effects of repeated cell breathing (i.e., repetitive expansion and contraction of the battery cell thickness). In general, prior battery assemblies mitigate the effects of breathing at the expense of energy density because they provide void space, accommodate additional material to create void (e.g., carbon, polymer), or provide mechanical support (e.g., thick walls, "arched" or non-linear angles). For example, U.S. Pat. No. 5,879,831 discloses a battery case design that allows for unidirectional expansion, which is readily compensated for by applying an external mechanical counter to that direction. In the module, the batteries are bound within a module bundling/compression means under external mechanical compression, which is optimized to balance outward pressure due to expansion and to provide additional inward compression to reduce the distance between the positive and negative electrodes, thereby increasing the overall battery power. The resulting battery has an energy density of 60 Wh/kg.

In another example, U.S. Pat. Nos. 8,124,270 and 8,298,700 discloses a battery case that is formed of metal and a thin plate provided on a side face of the battery case. The thin plate has a plurality of rib-like protruding portions, formed in parallel at appropriate intervals, for forming spaces that are opened at both ends between the side face of the battery case and the protruding portion. The thin plate is bonded to the side face of the battery case by bringing at portions between the protruding portions into surface-contact with the side face of the battery case. The protruding portions increase surface strength of the side face of the battery case, thus suppressing expansion of the side face of the battery case caused by the pressure inside the battery. Similarly, U.S. Pat. No. 9,343,772 discloses a secondary battery including an electrode assembly; a pressurization holder generally encompassing the electrode assembly, the pressurization holder having at least one side wall having an exterior-facing surface and an interior-facing surface, wherein at least one of the exterior-facing surface and the interior-facing surface has a buffer recess; and a case housing the electrode assembly and the pressurization holder. In another example, US Published Application No. 2008/01234625 A1 discloses a sealed bipolar battery having a plurality of battery cells arranged in a cell stack and having a casing that bears the forces that are applied by the cell stack. More specifically, a low-cost casing with built-in mechanical compliance that can provide the necessary mechanical preloaded forces to the electrode stack after battery assembly may be provided by shaping at least one part of the casing wall in a concave manner (so that it arcs in toward the cell stack) before assembly.

In yet another example, U.S. Pat. No. 7,704,637 discloses a lithium ion battery characterized in that a porous elastomer made of non-metal material is provided among the positive and negative electrodes groups or between the electrodes groups and the inner wall of the shell; and the elastomer is in the shape of a sheet or stick. The thickness of the elastomer is 0.5 mm-5.0 mm, and the elastomer has a porosity of 10%-80%. This battery can effectively avoid the expansion of the shell during the cycle of charge and discharge.

Finally, US Published Application No. 2011/0177377 A1 (Dube) discloses an expandable battery pack with end plates joined by connecting devices that deform elastically up to a predefined limit as the battery expands and then deforms plastically (irreversibly). The battery expansion particularly targeted by this reference for accommodation by the plastic deformation of the connecting devices is the swelling (5-7%) of the battery as it ages over an extended time period [see Dube, e.g., Para. 0026].

SUMMARY

Rechargeable batteries with elastically compliant housing and methods for operating these batteries are described herein, where various embodiments of the apparatus and methods may include some or all of the elements, features and steps described below.

A rechargeable battery with elastically compliant housing includes a housing including a pair of substantially rigid end plates and an elastically compliant structure (i.e., that undergoes deformation that is primarily elastic rather than plastic, wherein the substantially rigid end plates are more rigid than the elastically compliant structure—i.e., the substantially rigid end plates exhibit less beam-bending deflection than does the elastically compliant structure when subject to the same forces). The elastically compliant structure joins the end plates so that the end plates are oriented in respective planes that are substantially parallel to each other (i.e., the end plates are similarly oriented along respective orthogonal axes such that the respective lengths and widths of the respective end plates define planes that are parallel to each other) and that define a gap there between. The rechargeable battery also includes at least one battery cell contained in the housing in the gap between the end plates, wherein the battery cell includes an anode, a cathode, and a separator between the anode and the cathode, wherein each of the anode and cathode have a thickness along its shortest dimension. The elastically compliant structure joins the rigid end plates and includes an elastic component that exhibits elastic expansion greater than 3%, and in particular embodiments, greater than 5%, along an axis parallel to the direction of largest dimensional change during cycling to accommodate expansion and contraction (i.e., "breathing" of the cells) during each cycle of charging and discharging the battery.

Embodiments of the rechargeable battery include housing for an assembly of battery cells, wherein the housing is constructed to reversibly accommodate greater than 5% expansion and contraction (i.e., elastic—rather than plastic—compliance) of the battery during a charge and discharge cycling. Battery assemblies comprising housing of materials and construction that exhibit inelastic compliance (or an inability to reversibly accommodate >5% expansion and contraction of the battery during charge and discharge cycling) can suffer rapid capacity fade and loss of power density. While not being limited by any particular mode of operation, it is thought that the greater than 5% volume expansion/contraction of battery assemblies formed of inelastic compliant materials can correspond with increased inter-electrode gap, electrode thickness, and cell resistance, thus resulting in rapid capacity fade, and loss of rate capability.

In particular embodiments, the rechargeable battery is a rechargeable lithium battery, comprising a plurality of prismatic cells connected in series or in parallel, enclosed in an elastically compliant housing capable of providing greater than 0.08 MPa uniaxial force (i.e., stack pressure) in the direction orthogonal to the electrode stack layers within the cells (wherein the applied stack force can be applied so as to be substantially uniform across the battery charge and discharge cycle) and capable of, e.g., >5% elastic displacement in the direction orthogonal to the electrode stack layers within the cells. In some embodiments, the uniaxial force increases monotonically during charge and then decreases monotonically during discharge cycling. In other embodiments, the uniaxial force changes by a small amount or is near constant during charge and discharge cycling.

In an embodiment of the invention, the cell may be a "Li-ion" cell comprising a alloying or conversion anode such as an Si anode or SiOx anode. In additional embodiments, the cell may be any metal-anode cell. In another embodiment, the anode may comprise an electronically conductive, ionically inactive material in whole or in part such as Cu. In an embodiment of the invention, the cell may be a rechargeable Li-metal cell. In yet another embodiment, the anode or cathode may rely upon more than one mode of reaction and active material. In an embodiment of the invention, the cell may comprise a conversion cathode. In an embodiment of the invention, the cell may have a liquid electrolyte. In another embodiment of the invention, the cell may have a solid electrolyte. In yet another embodiment of the invention, the cell may have a gel electrolyte. In still another embodiment, the cell may rely upon more than one electrolyte to provide the ionic pathway (e.g., anolyte, or anode protection film, and catholyte).

Embodiments of the rechargeable battery with an elastically compliant structure 16, as described herein, can offer a variety of advantages. For example, embodiments of the battery can accommodate greater than 5% breathing in elastic (recoverable) fashion. The battery can also be of a lightweight low-volume construction in comparison with traditional metal and plastic cases, so as to maintain high energy density and the specific energy of the cells. The use of rigid end plates, as described herein, can also provide stiffness at the face of the battery cell, thereby enabling at least constant, or high stack-pressure uniformity across the battery cell(s). Use of the elastically compliant structure, as described herein, can also provide mechanical ruggedness, protecting the cells from piercing, falling, etc.

BRIEF DESCRIPTION OF THE DRAWINGS

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

In descriptions of the mechanical designs, we distinguish components that are "rigid", "elastic", and "plastic". As will be readily appreciated, real-world components show mixed behaviour (finite deformation, and finite plastic deformation in addition to the elastic response), but the term "elastic" is used to describe the component that produces the majority of the elastic response of the design; "plastic" or "inelastic" may be used to describe a component that undergoes a deformation of which a substantial portion is not reversed when the strain is removed; and "rigid" or "substantially rigid" is used to describe a component that has an elastic response that is no more than that of the elastic component. Unless otherwise explicitly recited herein, any reference to "substantially parallel" is understood to refer to orientation of the planes formed by the end plates with respect to one another such that they are parallel, or nearly parallel, such as in a sheaf or bundle of planes, but not orthogonal. The plane of the end plate is defined such that its orientation is approximately normal to the direction needed to apply the majority of uniaxial compression cell, or cells stack assembly.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Battery assemblies that include a housing of materials and construction capable of elastic compliance enable the production of batteries with significantly higher energy density because changes in chemistry utilized to achieve high energy density fundamentally correspond to large (i.e., >5%) volume change. In one embodiment, the battery cells include rechargeable lithium metal cells.

In particular embodiments, a rechargeable battery includes a plurality of prismatic cells connected in series or in parallel. The prismatic cells are enclosed in a case that is capable of providing greater than 0.08 MPa uniaxial force in the direction orthogonal to the electrode stack layers (i.e., stack pressure) within the cells (even when the cells are discharged and in a contracted state) and that is capable of at least 5% elastic displacement in the direction orthogonal to the electrode stack layers within the cells. In some embodiments, the elastically compliant structure provides a compressive force parallel to the displacement that occurs during expansion and contraction with a force constant of the elastically compliant structure between at least 15 lbs/mm (i.e., at least about 380 lbs/in, or 66,500 N/m) and at least 150 lbs/mm (i.e., at least about 3,800 lbs/in, or 665,000 N/m). In other embodiments, the elastically compliant structure provides a compressive force parallel to the displacement that occurs during expansion and contraction with a force constant of the elastically compliant structure between at least 1.5 lbs/mm (6,650 N/m) and up to about 700 lbs/mm ($3.11 \times 10^6$ N/m).

Figure 1:
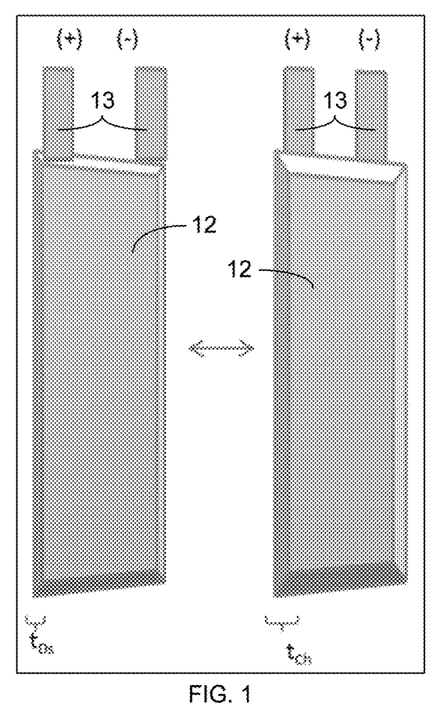
FIGS. 1 and 2 respectively show perspective and side views of an individual battery cell 12 in a contracted discharged state (left) and in an expanded charged state (right), wherein the thickness of the cell in the discharged state, $t_{Ds}$, is less than the thickness of the cell in the charged state, $t_{Ch}$.
Figure 2:
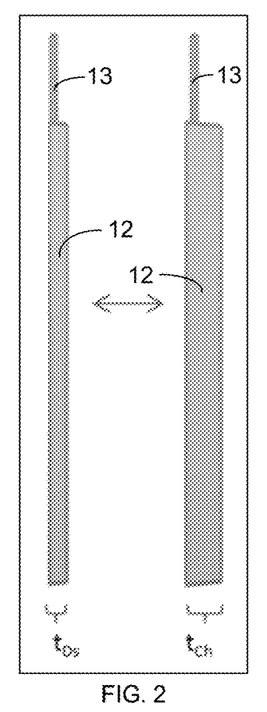

Two perspectives of an embodiment of an individual battery cell 12, depicting expansion and contraction of the cell 12 in the thickness dimension during charge and discharge, respectively, are provided in FIGS. 1 and 2. The battery cell 12 includes two terminals—i.e., an anode (formed, e.g., of graphite or of a lithium-silicon alloy, such as $Li_{22}Si_6$) and a cathode (formed of, e.g., lithium transition metal oxide) immersed in an electrolyte solution (e.g., a lithium salt in an organic solvent) that facilitates the transfer of lithium ions. A separator (e.g., a permeable membrane) is positioned between the anode and cathode to separate the anode from the cathode, allowing charge transport while preventing short circuits. The lithium ions move from the anode through the separator to the cathode during discharge and reverse that transit when charging. The thickness of the cell 12 in the discharged or contracted state is referred to as $t_{Ds}$, while the thickness of the cell 12 in the charged or expanded state, is referred to as $t_{Ch}$. As a general rule, $t_{Ds} < t_{Ch}$, as is shown in FIGS. 1 and 2.

Figure 3:
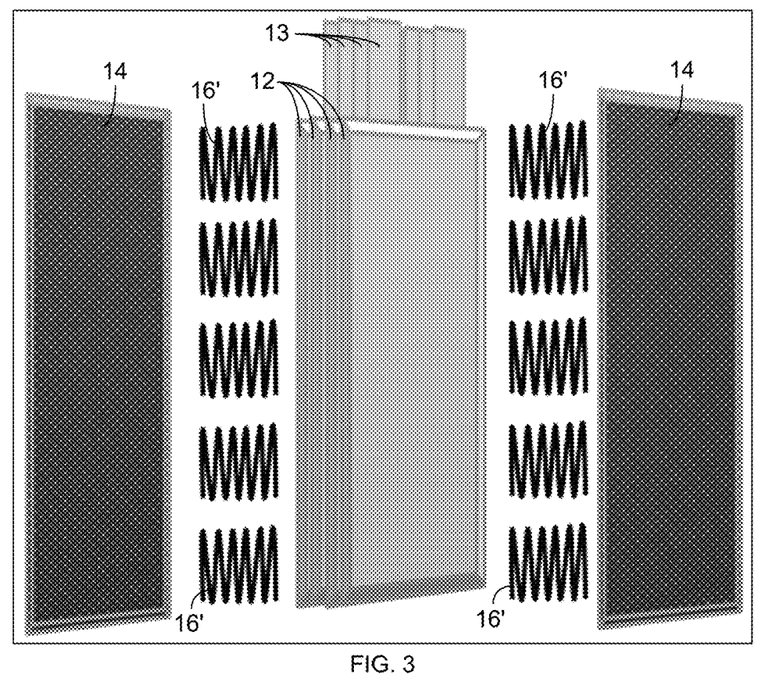
FIG. 3 is an exploded perspective view (prior to assembly) of an embodiment of battery components, including a plurality of prismatic battery cells 12, rigid end plates 14, and elastically compliant structures in the form of springs 16' that allow for elastic displacement of the end plates 14 as the cells 12 expand and contract (i.e., breathe) during charge and discharge.
Figures 4, 5:
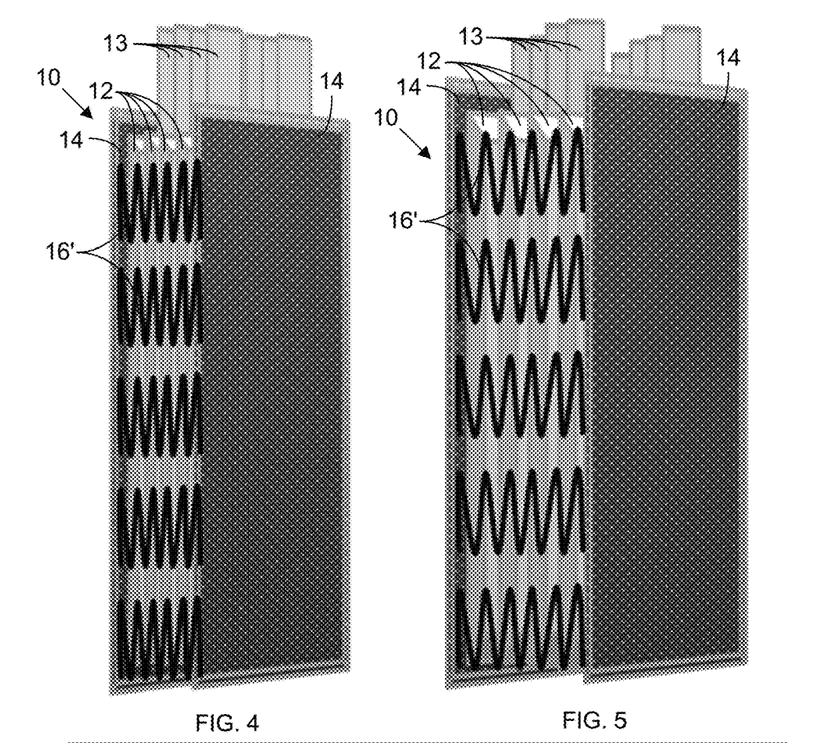
FIG. 4 is a perspective view of the battery 10 of FIG. 3 in a discharged state.
FIG. 5 is a perspective view of the battery 10 of FIGS. 3 and 4 in a charged state.

Schematic representations of an embodiment of battery housing components (including end plates 14 and an elastically compliant structure 16) enclosing one or more prismatic cells 12 are shown in an exploded view (FIG. 3), while contracted during discharge (FIG. 4), and while expanded in a charged state (FIG. 5). Two rigid end plates 14 are applied to the face of the plurality of cells 12 so as to maintain the uniformity of the thickness dimension (measured horizontally in the orientation of FIG. 2) across the entirety of the length dimension (measured vertically in the orientation of FIG. 2) and the width dimension (measured orthogonal to the drawing sheet in FIG. 2) of the cell face during expansion and contraction of the cells 12. The rigid end plates 14 can be formed of metal, plastic, ceramic, or carbon fiber material, or a combination of two or more of these materials, and can be in the form, e.g., of a honeycomb structure or woven fibers (to promote stiffness and rigidity). The rigid end plates 14, accordingly, are designed to remain substantially parallel as the thickness dimension increases and decreases because they are joined together by a set of springs 16' functioning as the elastically compliant structure in this embodiment; the springs 16' enable elastic displacement during the expansion and contraction (i.e., breathing) that occurs during the charge and discharge of the cells 12.

Figure 6:
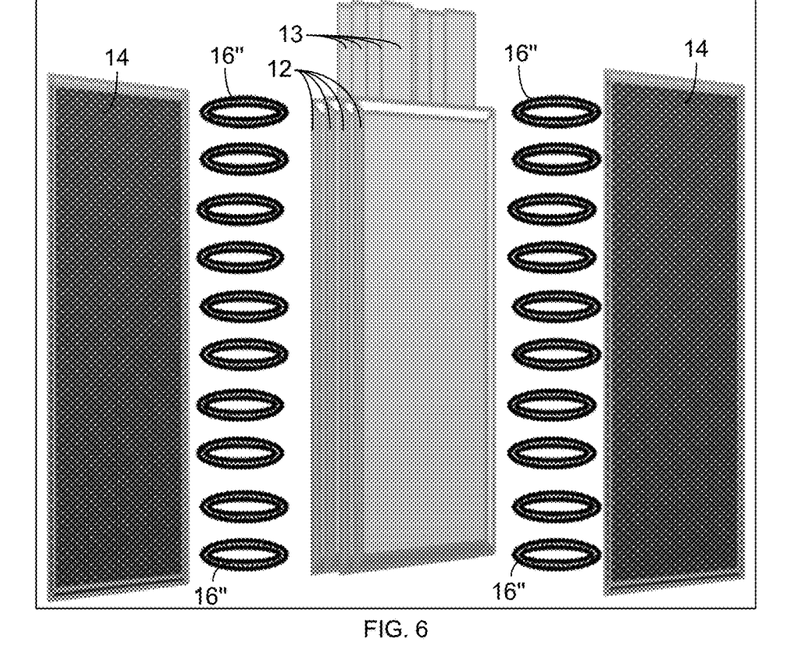
FIG. 6 is an exploded perspective view (prior to assembly) of a battery 10 similar to that of FIG. 3, except that elastic bands 16" are used as the elastically compliant structures in this embodiment in place of the springs 16' shown in FIG. 3.
Figure 7:
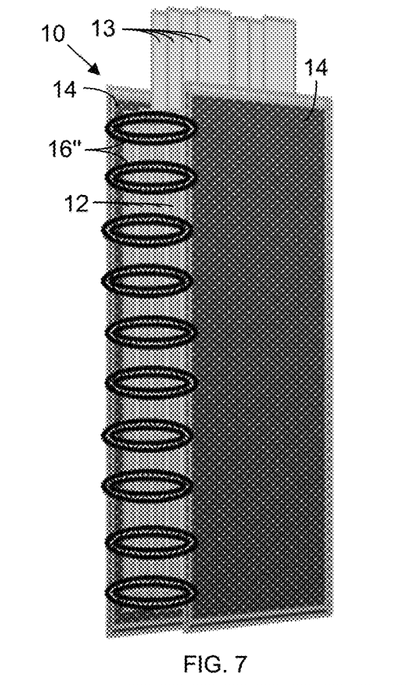
FIG. 7 is a perspective view of the battery 10 of FIG. 6 in a discharged state.
Figure 8:
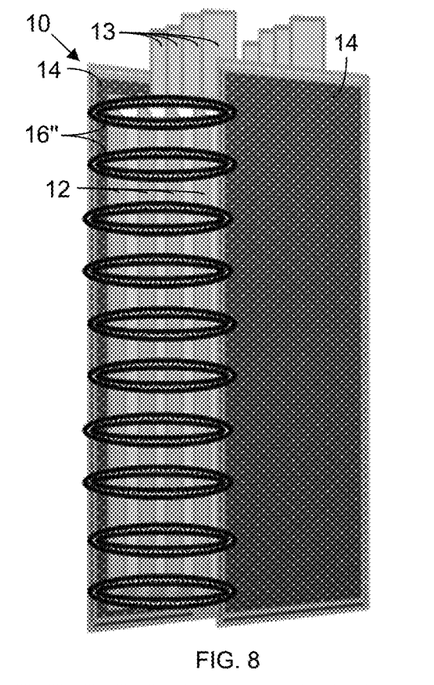
FIG. 8 is a perspective view of the battery 10 of FIGS. 6 and 7 in a charged state.

Schematic representations of another embodiment of battery housing components enclosing one or more prismatic cells 12 are shown in an exploded view (FIG. 6), while contracted during discharge (FIG. 7), and while charged in an expanded state (FIG. 8). The rigid end plates 14 are applied to the outer face of the cell(s) 12 so as to maintain the uniformity of the thickness dimension across the entirety of the length and width dimensions of the outer cell face during expansion and contraction. The rigid end plates 14 remain substantially parallel to each other as the thickness dimension increases and decreases with each charge-and-discharge breathing cycle because the rigid end plates 14 are joined together by a set of elastic bands 16" acting as the elastically compliant structure in this embodiment, enabling elastic displacement during the expansion and contraction that occurs, respectively, during charge and discharge. Non-limiting examples of materials of which the elastic bands can be formed, in whole or in part (e.g., as a component of a composite), include one or more of the following: rubber, nylon, vinyl, plastic, glass, metal, carbon, or ceramic. In some embodiments, the elastic band comprises woven fibers of the aforementioned materials, can form a dense or porous continuous mold, or can be infused within one or more materials of another kind (e.g., rubber infused nylon, plastic infused carbon fiber, etc.). As will be readily appreciated, the elastic material may be selected to achieve a specific desired range of elastic forces to be applied to the cell, given the dimensional expansion (i.e., the change in cell thickness between charged and discharged states: $t_{ch} - t_{dis}$). In particular embodiments, the elastic component includes an elastic band or a plurality of elastic bands, wherein at least one elastic band is mounted alongside at least one of the longer sides of the anode and cathode.

Figure 9:
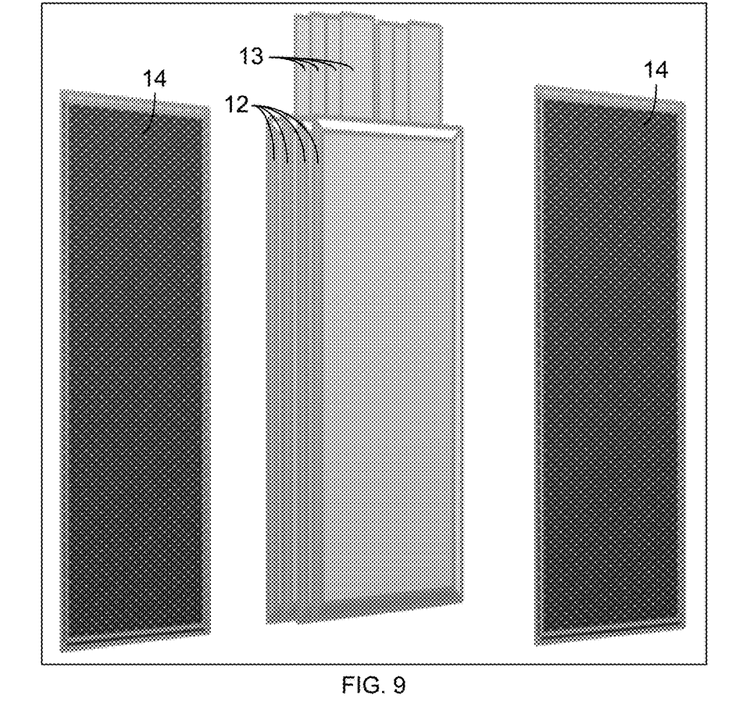
FIG. 9 is an exploded perspective view (prior to assembly) of a battery 10 similar to that of FIG. 3, except that a woven structure 16''' is wrapped around the rigid end plates 14 and battery cells 12 to allow for elastic displacement of the end plates 14 as the cells 12 expand and contract (i.e., breathe) during each charge and discharge cycle.
Figure 10:
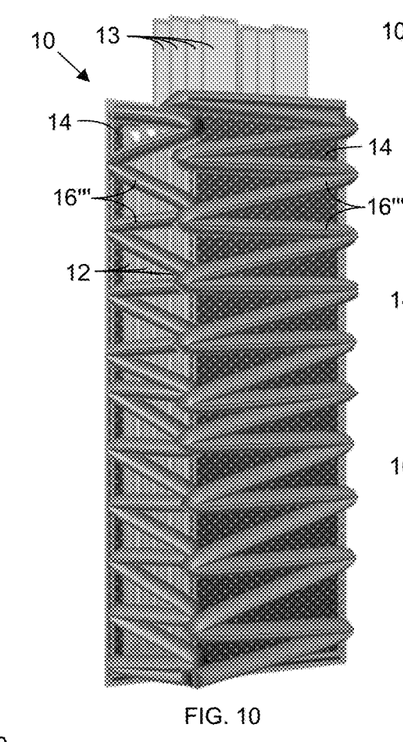
FIG. 10 is a perspective view of the battery 10 of FIG. 9 in a discharged state.
Figure 11:
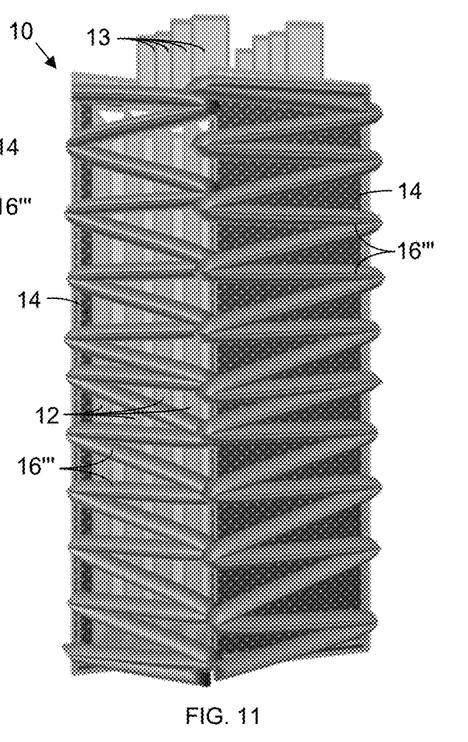
FIG. 11 is a perspective view of the battery 10 of FIGS. 9 and 10 in a charged state.

Schematic representations of yet another embodiment of battery housing components enclosing one or more prismatic cells 12 are shown in an exploded view (FIG. 9), while contracted during discharge (FIG. 10), and while expanded in a charged state (FIG. 11). Two rigid end plates 14 are applied to the outer face of the cell(s) 12 so as to maintain the uniformity of the thickness dimension across the entirety of the length and width dimension of the cell face during expansion and contraction as the cells breathe during charge and discharge. The rigid end plates 14 remain substantially parallel to each other as the thickness dimension increases during charging and decreases during discharging because they are joined together by a woven structure 16''' comprising one or more of, e.g., metal, plastic, pre-preg (i.e., fibers pre-impregnated with matrix material, such as epoxy), ceramic, or carbon fiber or borosilicate fiberglass. The woven structure 16''' is (a) wrapped around the entirety of the circumference of the battery cell(s) 12 and the end plates 14, (b) woven together around the entirety of the battery cell(s) 12 and the end plates 14, or (c) a combination of both. The fibers comprising the woven structure can be less than several millimeters in diameter, e.g., 0.5 mm, 1 mm, 2 mm, 5 mm, etc. The weave can be of any variety (e.g., plain, satin, twill, leno, cross-weave, fish weave, or unidirectional). The weave can cross at a non-zero and non-90° angle, e.g., at about 45°; and this angle will influence the elasticity of the woven structure 16''' and, consequently, the extent to which the woven structure will expand and contract. The weave can be infused with an additional material, e.g., plastic, adhesive, epoxy, acrylic, urethane, or silicone to form a composite matrix. In particular embodiments, the woven structure 16''' provides at least 11% compliance along the sides of the battery and 0% compliance on the top and bottom of the battery (in the orientation of FIGS. 12-15). The weave can also include multiple (e.g., three) layers (e.g., wrappings) of the woven structure 16''' to promote uniformity of expansion/contraction. More layers/wrappings of the woven structure 16''' increase the restoring force of the elastically compliant structure. This configuration not only enables elastic displacement during the expansion and contraction of the cell(s) 12 during charge and discharge but also reduces stress concentrations at the corners, where the rigid end plates 14 interface with the elastically compliant structure 16. In particular embodiments, the stress concentration that can arise where the woven structure wraps around the corners of the rigid end plates 14 can be reduced by rounding the corners of the rigid end plates 14 or by otherwise expanding the radius of curvature of the woven structure 16''' at the corners or by otherwise shaping the end plates to provide a non-uniform thickness along their edges. In other particular embodiments, it may be useful to reduce the stress concentration by decreasing the width of the rigid end plates 14 relative to the width of the prismatic cells 12.

Figure 12:
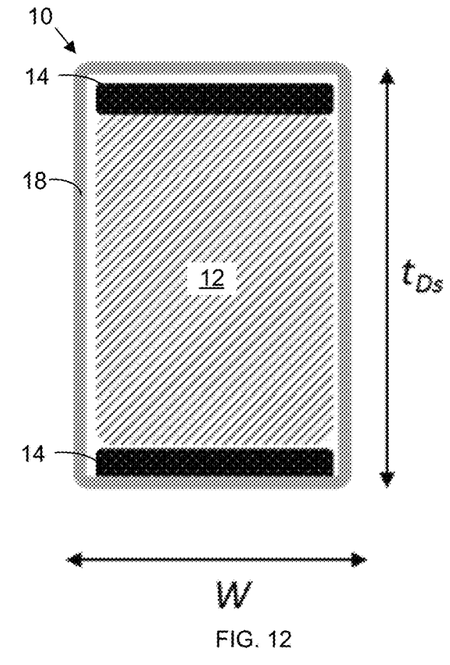
FIGS. 12 and 13 provide schematic sectional views of a battery 10 in a discharged state (FIG. 12) and in a charged state (FIG. 13), wherein the expansion in thickness of the battery 10 after charging is shown as h, and wherein the radius of curvature of the elastically compliant structures 16 at the corners is substantially close to zero.
Figure 13:
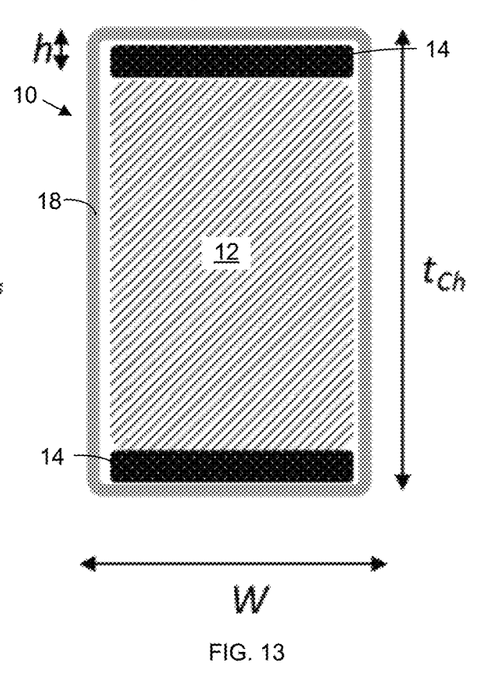

Schematic representations are provided from the top or bottom view of this embodiment of the battery 10 showing the battery housing 18 (including the rigid end plates 14 and the elastically compliant structure 16) enclosing one or more prismatic cells 12 when the cell(s) is/are discharged (in a contracted state) in FIG. 12 and when charged (in an expanded state) in FIG. 13. Two substantially rigid end plates 14 are applied to the outer faces of the cell(s) 12 so as to maintain uniformity of the thickness dimension, t, across the entirety of the length dimension (orthogonal to the plane of the page in the orientation shown in FIGS. 12 and 13) and width dimension, w, of the cell face, as shown in FIGS. 12 and 13, during expansion and contraction over each breathing cycle. The rigid end plates 14 remain substantially parallel as the thickness dimension, t, increases during charging and decreases during discharging because the substantially rigid end plates 14 are joined together by elastic material(s) (e.g., springs, elastic bands, or woven bands of material) that form the elastically compliant structure 16 and that can be wrapped around the entirety of the circumference of the battery cell(s) 12 and the end plates 14 or woven together around the entirety of the battery cell(s) 12 and the end plates 14, or a combination of both. The elastically compliant structure 16 accordingly enables elastic displacement during the expansion and contraction displayed during each charge and discharge cycle while reducing stress concentrations at the corners where the substantially rigid end plates 14 interface with the elastically compliant structure 16. The depiction of FIG. 12 represents a non-limiting example, wherein the radius of curvature at the corners formed between the elastically compliant structure 16 and the rigid end plates 14 is substantially close to zero so that the displacement represented by $t_{Ch}-t_{Ds}=h$ can be accommodated by expansion of the elastically compliant structure 16, alone.

Figure 14:
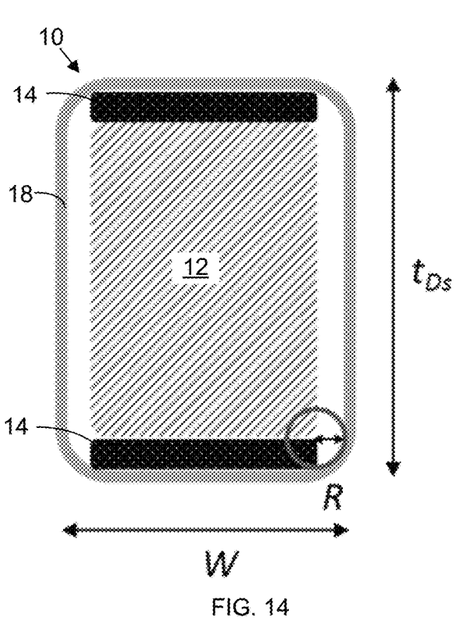
FIGS. 14 and 15 provide schematic sectional views of a battery 10 in a discharged state (FIG. 14) and in a charged state (FIG. 15), again with the expansion in thickness of the battery 10 after charging shown as h, and wherein the radius of curvature of the elastically compliant structures 16 at the corners is significantly greater than zero.
Figure 15:
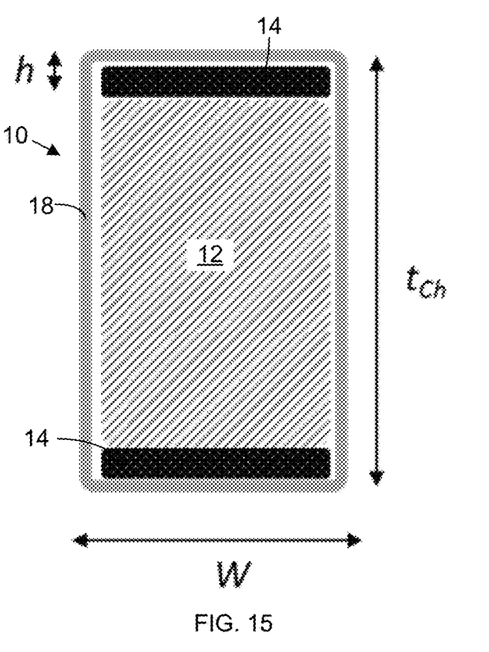

Schematic representations from the top or bottom view of the embodiment of the battery 10 showing battery housing components enclosing one or more prismatic cells 12 during discharge (contracted state) and charge (expanded state) are provided, respectively, in FIGS. 14 and 15. Two rigid end plates 14 are applied to the face of the cell(s) 12 so as to maintain uniformity of the thickness dimension, t, across the entirety of the length dimension and width dimension, w, of the cell face during expansion and contraction. The rigid end plates 14 remain substantially parallel as the thickness dimension, t, increases and decreases because they are joined together by the elastic material(s) (e.g., springs, elastic bands, woven bands of material) of the elastically compliant structure 16, which can be wrapped around the entirety of the circumference of the battery cell(s) 12 and the end plates 14 or woven together around the entirety of the battery cell(s) 12 and the end plates 14, or a combination of both. This configuration enables elastic displacement during the expansion and contraction of the battery cell(s) 12 that occurs during charge and discharge while reducing stress concentrations at the points where the corners of the rigid end plates 14 interface with the elastically compliant structure 16. The depiction above represents non-limiting examples wherein the radius of curvature at the corners formed between the elastic and rigid sides is significantly greater than zero so that the displacement represented by $t_{Ch}-t_{Ds}=h$ is accommodated by expansion of the elastically compliant structure 16 and reduction of the radius of curvature, R, wherein R≥0.25 h.

Figure 16:
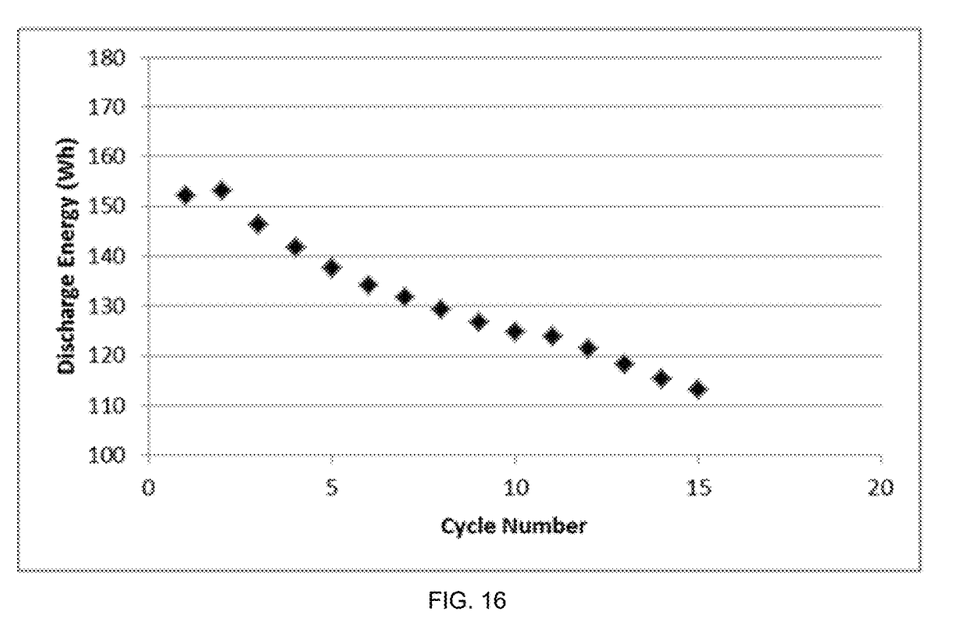
FIG. 16 plots the discharge energy of a battery 10 with a substantially inelastic battery housing (enclosing a plurality of cells discharged at 200 W) as a function of the number of cycles.

The discharge energy of an embodiment of a battery 10 comprising, in part, an inelastic battery housing 18 enclosing a plurality of battery cells 12 discharged at 200 W is plotted in FIG. 16, where the discharge energy can be seen to drop from over 150 Wh in a first discharge cycle to just over 110 Wh in a $15^{th}$ discharge cycle, which clearly represents a significant decline.

Figure 17:
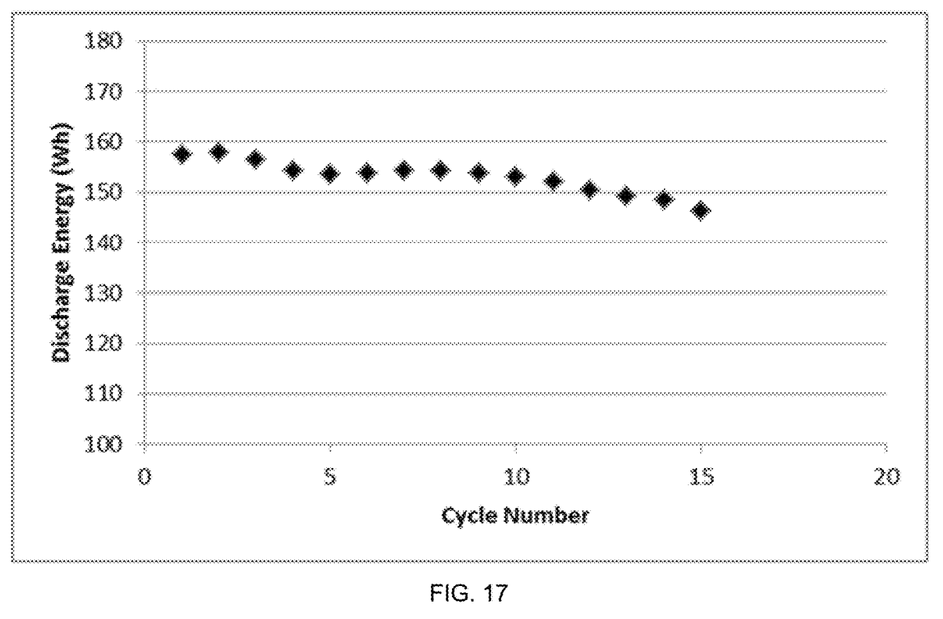
FIG. 17 plots the discharge energy of a battery with an elastic battery housing (including an elastically compliant structure 16 and enclosing a plurality of cells discharged at 200 W) as a function of the number of cycles.

In contrast, the discharge energy of an embodiment of a battery 10, comprising, in part, a battery housing 18, including an elastically compliant structure 16, enclosing a plurality of battery cells 12 discharged at 200 W, is plotted in FIG. 17, where the discharge energy drops off much less than was observed with the inelastic housing, as shown in FIG. 16. As is evident from FIG. 17, the discharge energy dropped only from about 158 Wh to about 147 Wh over 15 cycles.

Figure 18:
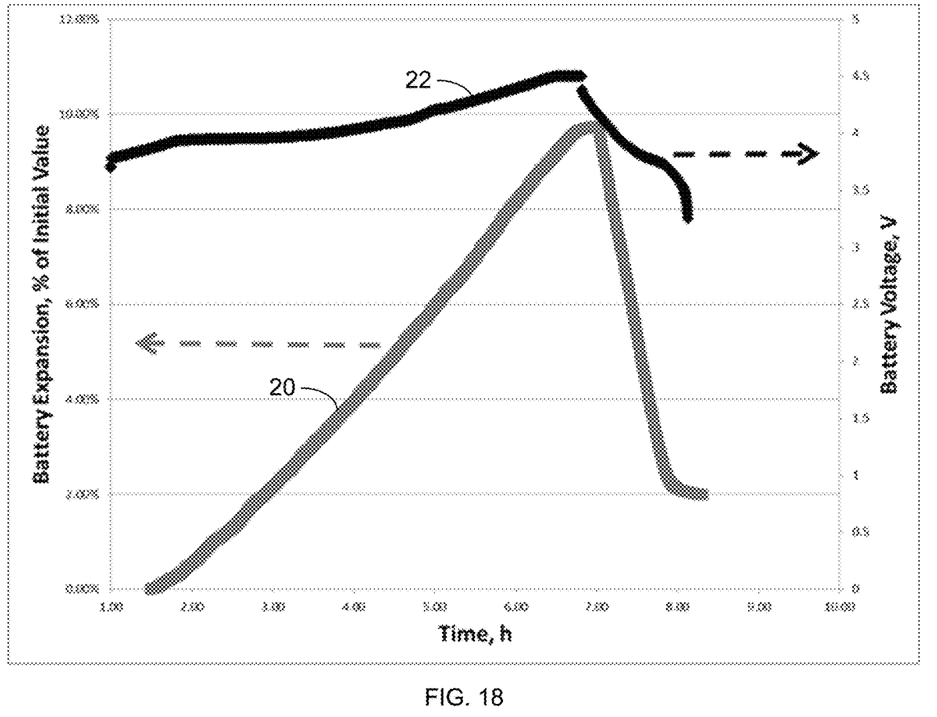
FIG. 18 plots the expansion and contraction of a battery with an inelastic housing, wherein the pack of battery cells 12 breathes by nearly 10% over a charge cycle, and wherein the housing contracts (during discharge) by substantially less than the amount that it initially expanded during the charge cycle. Plots of both battery expansion 20, as a percentage of initial thickness, and battery voltage 22 are shown as a function of time (in hours).

The expansion and contraction 20 of an embodiment of a battery 10 (defined as displacement from the initial thickness value observed during onset of charging through the completion of charge and the subsequent discharge) with an inelastic housing 18 is plotted in FIG. 18. The breathing of the pack of battery cells 12 is nearly 10% of the pack thickness through charge and discharge, as reflected by the plotted battery voltage 22 throughout the cycle. The inelastic housing 18 in this embodiment of the battery 10 contracts (with discharge) only about 80% of its initial expansion, thereby exhibiting a substantial amount of inelastic compliance, wherein a substantial portion of the breathing is not recovered within a single charge and discharge cycle.

Figure 19:
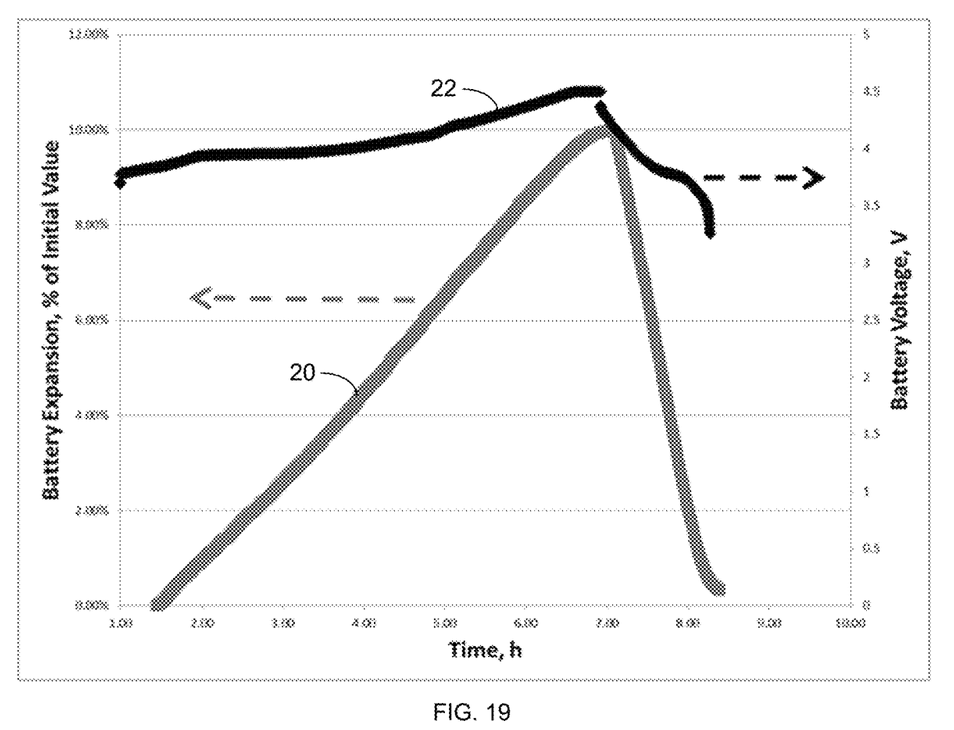
FIG. 19 plots the expansion and contraction of a battery with an elastic housing (including an elastically compliant structure 16) over a charge and discharge cycle, wherein the pack of battery cells 12 breathes by nearly 10%, and wherein the housing contracts (during discharge) by nearly 100% of its initial expansion (during charging).

The expansion and contraction of an embodiment of a battery with a housing 18 including an elastically compliant structure 16 is plotted in FIG. 19. The breathing of the pack of battery cells 12 in this embodiment is about 10% of the pack thickness through charge and discharge. The elastic housing 18, including an elastically compliant structure 16, of this embodiment of the battery 10 contracts (with discharge) nearly 100% of its initial expansion, evidencing a high restoring force and elastic compliance, wherein a high proportion of the breathing expansion is recovered with contraction within each charge and discharge cycle.

Figure 20:
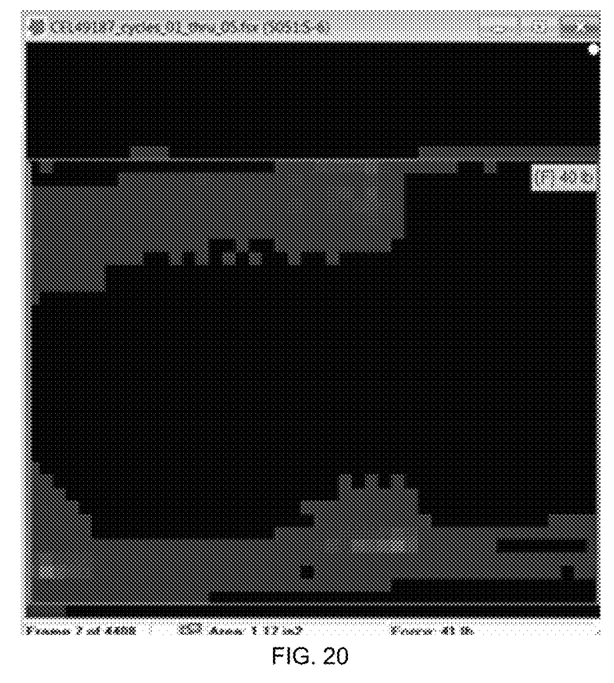
FIG. 20 depicts a force map during measurement of uniaxial force upon assembly of a battery with an elastic housing (including an elastically compliant structure 16 and enclosing a plurality of cells).

The stack pressure at the time of assembly of an embodiment of a battery including an elastically compliant structure 16 (e.g., that disclosed by FIG. 17 and FIG. 19) is greater than about 0.06 MPa to greater than about 0.08 MPa parallel to the displacement that occurs during expansion and contraction observed during charge and discharge. For example, FIG. 20 depicts the uniaxial force map of a pack of similar construction (8 cells in total) measured over an area of about 4 square inches (26 cm$^2$) just after assembly. The force measured is 41 lbs (182 N), so this force corresponds to a pressure greater than 10 psi, or 0.069 MPa.

Different configurations can be used to capitalize on different advantages in different applications. For example, where the rechargeable battery 10 is used in (e.g., to power) an unmanned aerial vehicle (UAV—e.g., a flying drone), the use of springs 16' as the elastically compliant structure 16 can be advantageous, as minimizing the weight of the structure is typically more important than minimizing the volume of the structure.

On the other hand, where the rechargeable battery 10 is used in a unmanned underwater vehicle (UUV), the use of elastic bands 16" as the elastically compliant structure 16 may be advantageous as the density of the UUV may be more easily matched to that of water.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A rechargeable battery with elastically compliant housing, comprising:
   a housing including a pair of substantially rigid end plates and an elastically compliant structure extending between and joining the substantially rigid end plates so that the substantially rigid end plates are oriented in respective planes that are substantially parallel to each other and define a gap there between; and
   at least one battery cell contained in the housing in the gap between the substantially rigid end plates, wherein the battery cell includes an anode, a cathode, and a separator between the anode and the cathode, wherein each of the anode and cathode have a thickness along its shortest dimension,
   wherein:
      the elastically compliant structure joins the substantially rigid end plates and includes an elastic component that exhibits reversible elastic expansion greater than 3% along an axis orthogonal to the planes in which the substantially rigid end plates are oriented;
      the elastically compliant structure wraps around the substantially rigid end plates; and
      at least one of the anode and the cathode is configured for displacement via expansion or contraction in thickness as ions are transferred between the anode and the cathode, wherein the elastically compliant structure and edges of the substantially rigid end plates—where the elastically compliant structure wraps around the substantially rigid end plates—have a radius of curvature that is at least one-quarter the displacement that occurs during expansion or contraction.

2. The rechargeable battery of claim 1, wherein the substantially rigid end plates have a width in the respective plane in which each is oriented that is less than or equal to a width of the at least one battery cell measured parallel to the widths of the substantially rigid end plates.

3. The rechargeable battery of claim 1, wherein the housing has a substantially cylindrical shape.

4. The rechargeable battery of claim 1, wherein the elastically compliant structure provides a pressure that is greater than 0.06 MPa parallel to the displacement that occurs during expansion and contraction.

5. The rechargeable battery of claim 1, wherein the elastically compliant structure provides a compressive force parallel to the displacement that occurs during expansion and contraction with a force constant of at least 6,650 N/m.

6. The rechargeable battery of claim 1, wherein the anode comprises at least one of the following: (a) a metal; (b) an alloy; and (c) an intermetallic compound comprising an element selected from Li, Na, Mg, Al, and Ca.

7. The rechargeable battery of claim 1, wherein the anode comprises silicon and lithium, at least in part.

8. The rechargeable battery of claim 1, wherein at least one of the cathode and the anode comprises a material configured to undergo an insertion reaction, an alloying, an intercalation, a disproportionation, a conversion reaction, or a combination thereof.

9. The rechargeable battery of claim 1, wherein the electrolyte comprises a solid.

10. The rechargeable battery of claim 1, wherein the electrolyte comprises a liquid.

11. The rechargeable battery of claim 1, wherein the electrolyte comprises a gel.

12. The rechargeable battery of claim 1, wherein each of the anode and the cathode have a substantially rectangular cross-section with a pair of longer sides and a pair of shorter sides including positive and negative terminals, wherein both the longer and the shorter sides are orthogonal to the thickness of the anode and cathode.

13. The rechargeable battery of claim 12, wherein the elastic component includes a spirally wound spring or a plurality of spirally wound springs, wherein at least one spring is mounted alongside at least one of the longer sides of the anode and cathode.

14. The rechargeable battery of claim 13, wherein the spirally wound spring circumscribes at least one battery cell.

15. The rechargeable battery of claim 12, wherein the elastic component includes an elastic band that circumscribes at least one battery cell.

16. The rechargeable battery of claim 12, wherein the elastic component includes at least one layer of a woven structure.

17. The rechargeable battery of claim 16, wherein the woven structure comprises at least one of the following types of fibers: carbon fibers, metal fibers, borosilicate fibers, plastic fibers, and ceramic fibers.

18. The rechargeable battery of claim 16, wherein the woven structure is embedded in a matrix to form a composite fabric, wherein the matrix comprises at least one of the following: plastic, adhesive, epoxy, and resin.

19. The rechargeable battery of claim 16, wherein the fibers are cross-woven at non-zero° and non-90° angles relative to the thickness of the anode and the cathode.

20. The rechargeable battery of claim 12, wherein the elastically compliant structure exhibits elastic expansion greater than 5% along the axis orthogonal to the planes in which the substantially rigid end plates are oriented.

21. A battery-powered electronic device, comprising:
  i) a rechargeable battery with elastically compliant housing, wherein the rechargeable battery comprises:
    a) a housing including a pair of substantially rigid end plates and an elastically compliant structure joining the substantially rigid end plates so that the substantially rigid end plates are substantially parallel to each other and define a gap there between;
    b) at least one battery cell contained in the housing in the gap between the substantially rigid end plates, wherein the battery cell includes an anode, a cathode, and a separator between the anode and the cathode, wherein each of the anode and cathode have a thickness along its shortest dimension, and wherein the separator allows passage of ions there through from the cathode to the anode during charging;
    c) a positive terminal electrically coupled with the cathode; and
    d) a negative terminal electrically coupled with the anode,
  wherein:
    the elastically compliant structure joins the substantially rigid end plates and includes an elastic component that exhibits elastic expansion greater than 3% along an axis orthogonal to planes in which the substantially rigid end plates are oriented;
    the elastically compliant structure wraps around the substantially rigid end plates; and
    at least one of the anode and the cathode is configured for displacement via expansion or contraction in thickness as ions are transferred between the anode and the cathode, wherein the elastically compliant structure and edges of the substantially rigid end plates—where the elastically compliant structure wraps around the substantially rigid end plates—have a radius of curvature that is at least one-quarter the displacement that occurs during expansion or contraction;
  ii) an electrically conductive return pathway extending from the positive terminal;
  iii) an electrically conductive delivery pathway extending from the negative terminal; and
  iv) at least one electrically powered mechanism coupled with the electrically conductive return pathway and with the electrically conductive delivery pathway.

22. The battery-powered electronic device of claim 21, wherein the electrically powered mechanism includes at least one inductive motor.

23. The battery-powered electronic device of claim 22, wherein the electrically powered mechanism includes a rotor, and wherein the battery-powered electronic device is a flying drone.

* * * * *